Aug. 28, 1934.   I. DUBINBAUM ET AL   1,971,479
METHOD OF TREATING WASTE RESIDUES
Filed March 9, 1931
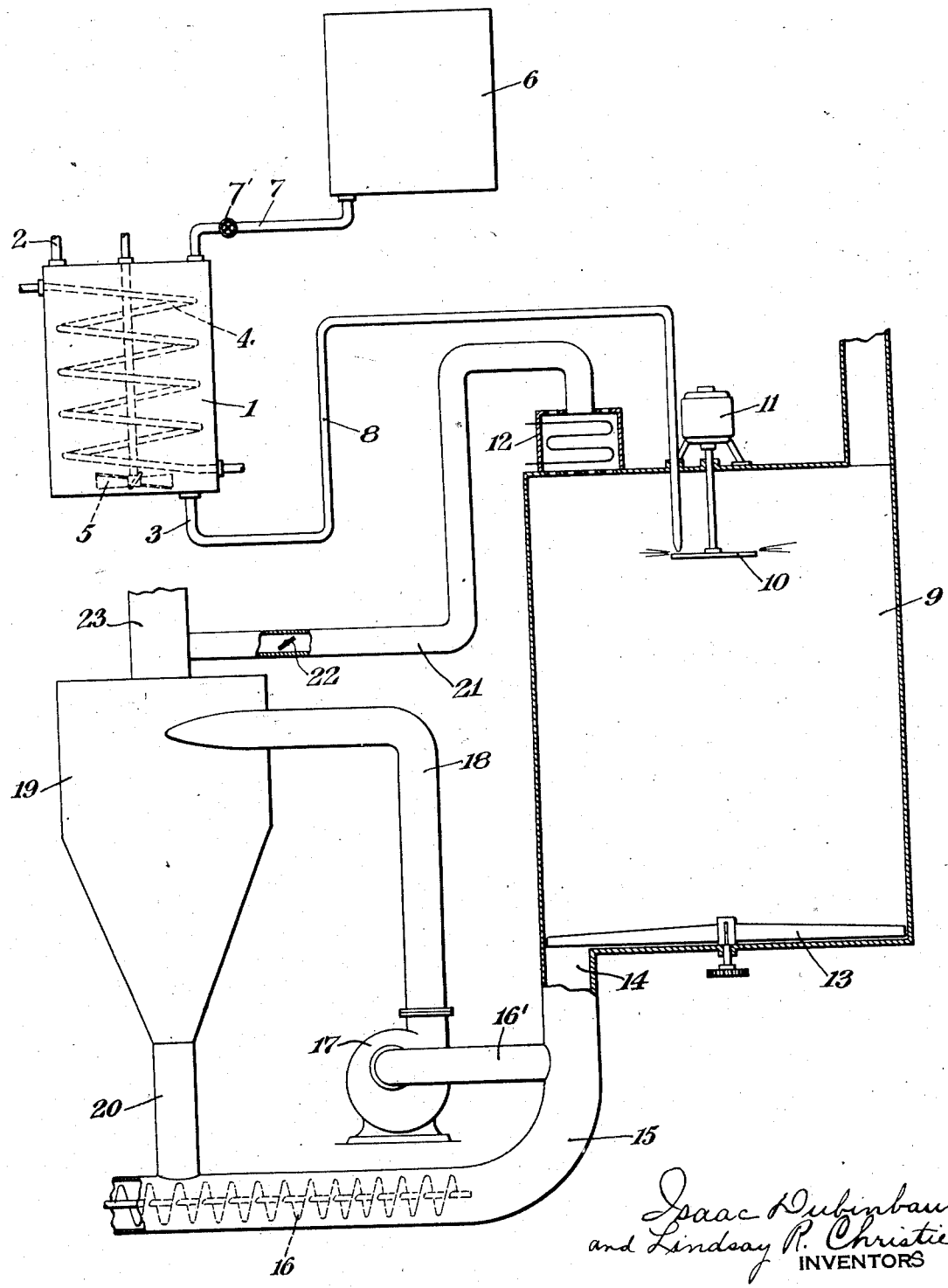
Isaac Dubinbaum
and Lindsay R. Christie
INVENTORS
BY
Prindle, Bean & Mann
ATTORNEYS Patented Aug. 28, 1934

1,971,479

UNITED STATES PATENT OFFICE 1,971,479

METHOD OF TREATING WASTE RESIDUES

Isaac Dubinbaum, New York, N. Y., and Lindsay R. Christie, Pittsburgh, Pa.

Application March 9, 1931, Serial No. 521,266

2 Claims. (Cl. 71—9)

This invention relates to a method of recovering certain valuable substances from waste residues of the yeast-making industry, or similar substances, and the product thereof.

In the process of making yeast there is left a waste liquid residue commonly called "spent beer" which, at present, is looked upon as a nuisance and is thrown away, thereby creating problems of disposal of an obnoxious residue. The "spent beer", however, contains valuable plant food ingredients which should not be wasted.

In the course of our investigations and experimentations we discovered that, when treated in the manner to be described later, the dry substance recovered from the spent beer residue, constitutes a most valuable fertilizer material, containing up to about twelve per cent (12%) of water soluble potassium salts and up to about two per cent (2%) ammonia,—two of the most valuable plant food ingredients. The quantity of these plant food ingredients depends upon the materials from which the yeast is made.

The spent beer is hygroscopic and mere dehydration will not destroy this characteristic. If the spent beer is dehydrated, the product seems to be dry, but will freely absorb moisture from the air and become sticky and glue-like, and as a result, extremely difficult to be handled.

Briefly outlined our process of recovery comprises the following steps. The spent beer, either in concentrated or non-concentrated form, is mixed with sulphuric acid for the purpose of destroying the substances which cause the product to become hygroscopic and for fixing and minimizing the loss of nitrogen. When the reaction is substantially completed, the mixture is sprayed by means of centrifugal force into a circular drying room, heated to the proper temperature. The centrifugal force breaks up the liquid into a mist or fine spray, and the individual particles are dehydrated and dried instantly, settling to the floor of the dryer in the form of a dry powder. From the floor of the dryer, the dried powder is mechanically removed. The process is a continuous and automatic one in which we start at one end with the "spent beer" and without interruption or handling the permanently dry nonhygroscopic material in the form of a dry powder is obtained at the other end. The product may be sacked or stored in bulk for carlot shipments in bulk.

Referring now to the drawing—

The figure represents a diagrammatic showing of one form of apparatus for practicing our process and producing our product, but it is to be expressly understood that the process may be practiced in various other means and that we are not limited to our invention except as the subject-matter defined in the claims hereinafter appended.

In the drawing the numeral 1 designates a heater having an inlet 2 and an outlet 3, which is heated by the steam coil 4 or other medium. In this heater is a mechanical stirrer 5 for mixing the "spent beer". Located above the heater is a tank 6 for containing sulphuric acid which is added to the spent beer in heater 1 by means of the pipe 7. A valve 7' is provided in the pipe 7 so as to control the flow of liquid to tank 1. Leading from the outlet 3 is a conduit 8 which leads into a circular drying room or tower 9. A pump may be provided in conduit 8 so that the rate of flow of liquid to the disk may be regulated. Located substantially in the center of the top of the drying room or tower is a disk 10 which is adapted to be rotated by a motor 11, and which may be driven at varying speeds. The conduit 8 discharges the heated spent beer on the revolving disk 10. The liquid is thrown from the disk and is mechanically broken and sub-divided into microscopic particles. This disk constitutes means for mechanically atomizing or pulverizing the liquid mixture so as to present the liquid mixture in a finely divided form to the heated current of air.

Located on the top of the drying room or tower 9 is a heater 12 which communicates with the drying room or tower. The heater may be placed on the floor and flues then lead the heated air to a point near the top of the tower. Any form of heating means may be employed. Air is drawn through this heater by means of a blower, later to be described. It is to be expressly understood, however, that air may be forced through the heater instead of being drawn through by the blower. The particles thrown from the rotating disk into the tower come in contact with the currents of heated air and are dried and fall to the bottom of the tower in a dry condition.

A scraper or sweep 13 is provided on the bottom of the drying room or tower which discharges the settled powder through opening 14 in the bottom of the drying room or tower 9. Connected with the outlet 14 is a conduit 15 which connects with a water cooled screw conveyor 16 for carrying away the particles which settle to the bottom of the conduit 15. Connected to the conduit 15 by means of the pipe 16' is a blower 17 for the purpose of recirculating some of the air used in the process. This blower or fan is provided with conduit 18 which communicates with a cyclone or other form of separator 19. The powder which is separated from the air is conducted to the water cooled screw conveyor 16 by means of a chute 20. Other similar cooling means can be used. Connected with the outlet flue of the cyclone separator 19 is a pipe 21 provided with a damper 22 which connects with the heater 12. The damper provides a means for varying the amount of air that is recirculated through the heater. An outlet 23 is provided in the top of separator 19 to allow the escape of waste gases.

We have also discovered that the waste gases from the dryer on reaching a certain temperature carry along with them a tar similar in nature to a coal tar. Recovery of this tar can be accomplished by passing the waste gases through a suitable condenser.

The process will now be described more fully. The liquid waste residue to be dried is placed in the mixing tank provided with the heating coil and agitator, and then sulphuric acid is added to the mixture. The sulphuric acid may be added to the cold or hot waste liquid, the liquid being either in highly concentrated form or in dilute form. After chemical reaction has taken place, the treated liquid is pumped or otherwise conducted to a revolving disk, and the centrifugal force created by the velocity of the revolving disk breaks up the liquid into a mist of small particles. The minute particles are thrown into a heated atmosphere. Drying takes place instantaneously, and the dry particles settle to the floor of the tower. The air is heated by passing through a heating chamber and is then delivered or conducted to a point near the top of the tower. A blower is provided so that the moisture-laden hot air is drawn off at the bottom of the tower and a portion is recirculated through the heater. The remainder of the waste gas is permitted to escape into the atmosphere through the outlet in the top of the separator.

A revolving scraper or sweep located on the floor of the tower discharges the dry material to a conduit which conducts the particles to a water or similar cooled conveyor. The particles which are separated from the moisture-laden air are also delivered to this conveyor. This conveyor conducts the material either to a storage hopper or bin, or it may be immediately packed at this point.

From the foregoing it will be apparent that by using our method we obtain a highly valuable product from a waste residue which is at present considered a nuisance. Furthermore, the method is entirely automatic and the operation of the drying plant requires the minimum of help and the recovery is, therefore, accomplished at a very low cost. The product is of high grade and its physical appearance is uniform. The plant food ingredients in our product are in the most available form.

What we claim is:

1. A method of treating waste yeast residues, which comprises, mixing sulphuric acid therewith, pulverizing the liquid mixture to make small particles, subjecting the particles to a current of heated air to dry the particles, and recirculating a portion of the air in the process.

2. A method of treating waste yeast residues, which comprises, mixing a mineral acid therewith, pulverizing the liquid mixture to make small particles, subjecting the particles to a current of heated air to dry the particles, separating the air and the particles, and then separating a tar product from the waste air.

ISAAC DUBINBAUM.
LINDSAY R. CHRISTIE.